United States Patent Office 3,026,332
Patented Mar. 20, 1962

3,026,332
NITROFURFURYLIDENE HYDROXY ACID HYDRAZIDES
Anthony Holland, Hornchurch, and Ronald Slack, London, England, assignors to May & Baker Limited, Dagenham, England, a company of Great Britain
No Drawing. Filed Nov. 12, 1959, Ser. No. 852,184
Claims priority, application Great Britain Nov. 17, 1958
2 Claims. (Cl. 260—347.3)

This invention relates to nitrofurfural derivatives, to processes for their preparation and compositions containing them.

According to the present invention, there are provided new nitrofurfural derivatives of the general formula:

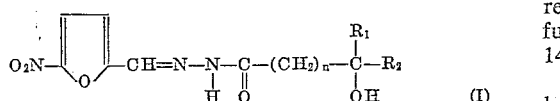

(I)

wherein $R_1$ represents a hydrogen atom, an alkyl or aryl (preferably phenyl) group, $R_2$ represents a hydrogen atom or an alkyl group, and $n$ represents 0, 1, 2 or 3.

These new nitrofurfural derivatives have been found to be useful in the treatment of protozoal, bacterial, and fungal infections in domestic animals. They are particularly useful in the treatment of poultry diseases, especially coccidiosis. High activity has also been demonstrated against important Gram negative and Gram positive strains of pathogenic bacteria such as *Streptococcus pyogenes*, *Micrococcus pyogenes* var. *aureus*, *Escherichia coli* and *Pseudomonas pyocyanae*. A compound of outstanding utility is N-(5'-nitrofurfurylidene)lactic acid hydrazide.

According to a feature of the present invention, the nitrofurfural derivatives of general Formula I are prepared by reacting 5-nitrofurfural, or a derivative thereof such as the diacetate, acetal or oxime, with a hydrazide of the general formula:

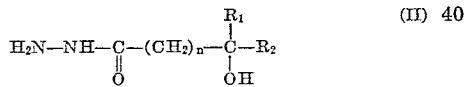

(II)

(wherein $R_1$, $R_2$ and $n$ are as hereinbefore defined), preferably in an inert organic solvent, e.g. ethanol, if necessary, in the presence of a condensing agent such as sulphuric acid.

The starting materials of Formula II where $n$ is 1 or 2 may be prepared by known methods. Those compounds where $n$ is 3 may conveniently be prepared from a lactone of formula:

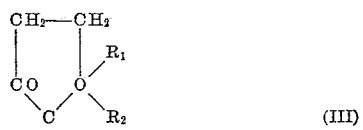

(III)

(wherein $R_1$ and $R_2$ are as hereinbefore defined) by reaction with hydrazine. Particularly convenient lactones are the commercially available γ-butyro- and γ-valerolactones.

According to a further feature of the invention, the nitrofurfural derivatives of general Formula I may be prepared by treating 5-nitrofurfural hydrazone with an acylating agent such as the lactone, anhydride or ester of the appropriate carboxylic acid

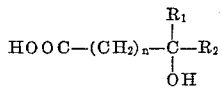

(wherein $R_1$, $R_2$ and $n$ are as hereinbefore defined).
The following examples illustrates the invention.

Example I 5-nitrofurfural diacetate (50 g.) was heated under reflux on the stem bath for 15 minutes in a mixture of concentrated sulphuric acid (58 cc.), water (330 cc.) and ethanol (500 cc.). The alcohol was removed by distillation under reduced pressure, and the residual syrup was extracted with ether, washed once with water, and dried (sodium sulphate, or magnesium sulphate and a little charcoal). The residue obtained after evaporating the ethereal extract was dissolved in ethanol (50 cc.) and added to a solution of 4-hydroxyvaleric hydrazide (26.5 g.) in ethanol (300 cc.), and the solution was set aside at room temperature. The hydrazone which separated was collected after 24 hours, washed with ether and recrystallised from ethanol or water to give N-(5'-nitrofurfurylidene)-4-hydroxyvaleric acid hydrazide, M.P. 143° C.

Similarly prepared were N-(5'-nitrofurfurylidene)-4-hydroxybutyric acid hydrazide, M.P. 142–145° C., N-(5'-nitrofurfurylidene)-4-hydroxyundecanoic acid hydrazide, M.P. 130° C., and N-(5'nitrofurfurylidene)-4-hydroxynonoic acid hydrazide, M.P. 129° C.

Example II 5-nitrofurfural (12.15 g.) in ethanol (50 cc.) was added to a solution of lactic acid hydrazide (15.6 g.) in ethanol (250 cc.) and the mixture was set aside at room temperature overnight. The bright yellow precipitate which separated was collected and recrystallised from ethanol to give N-(5'-nitrofurfurylidene)lactic acid hydrazide, M.P. 189–190° C.

In a similar manner there were prepared the following compounds:

N-(5'-nitrofurfurylidene)-3-hydroxypropionic acid hydrazide, M.P. 192° C.;
N-(5'-nitrofurfurylidene)-2-hydroxyisobutyric acid hydrazide, M.P. 207° C.;
N-(5'-nitrofurfurylidene)-3-hydroxybutyric acid hydrazide, M.P. 151–154° C.;
N-(5'-nitrofurfurylidene)-2-hydroxybutyric acid hydrazide, M.P. 194° C.;
N-(5'-nitrofurfurylidene)glycollic acid hydrazide, M.P. 220° C.;
N-(5'-nitrofurfurylidene)-3-hydroxyisovaleric acid hydrazide, M.P. 150–152° C.;
N-(5'-nitrofurfurylidene)-3-hydroxy-3-methylvaleric acid hydrazide, M.P. 176–177° C.;
N-(5'-nitrofurfurylidene)-3-hydroxy-3-methylcaproic acid hydrazide, M.P. 179–181° C.;
N-(5'-nitrofurfurylidene)-3,4-dimethyl-3 - hydroxyvaleric acid hydrazide, M.P. 191–192° C.;
N-(5'-nitrofurfurylidene)-3-ethyl-3 - hydroxyvaleric acid hydrazide, M.P. 202–203° C., and
N-(5'-nitrofurfurylidene)-5 - hydroxyhexanoic acid hydrazide, M.P. 145° C.

The present invention includes within its scope therapeutically useful, more especially veterinary, compositions which comprise one or more of the compounds of general Formula I together with a significant amount of a non-toxic carrier which may be either a solid material or a liquid. In clinical practice the compounds of the present invention will normally be administered orally, in consequence of which the preferred compositions are those of the kind suitable for oral administration.

Solid compositions for oral administration include compressed tablets, pills, dispersible powders, and granules. In such solid compositions one or more of the active compounds of general Formula I is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration also include capsules of absorbable material such as gelatin containing one or more of the active substances of general Formula I with or without the addition of diluents or excipients.

Preparations according to the invention for parenteral administration include sterile aqueous or non-aqueous, solutions, suspensions, or emulsions. Examples of non-aqueous solvents or suspending media are propylene glycol, polyethylene glycol, vegetable oils such as olive oil, and injectable organic esters such as ethyl oleate. The compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

For the treatment of animals, such as poultry with coccidiosis, the nitrofurfural compounds may be incorporated in the animal foodstuff, i.e. an organic or mineral substance which is intended to be fed to the animals, or drinking water. Incorporation of the active ingredient in the foodstuff, which in the case of fowl may be a commercial starting, laying or growing mash, may be effected by dissolving the nitrofurfural in an organic solvent, dispersing the solution so obtained in the food and removing the solvent by any means known to the art. The nitrofurfural may also be incorporated in the foodstuff in the form of a powder containing the active ingredient or ingredients and a solid, non-toxic inert carrier, e.g. talc, kaolin or chalk. To the powders there may be added before admixture to the foodstuff one or more non-toxic wetting and/or dispersing agents, for example, the condensation product of β-naphthalene sulphonic acid and formaldehyde or sodium lauryl sulphate. When a wetting or dispersing agent is added to the powder, the composition so obtained may be mixed with water to provide stable dispersions suitable for addition to drinking water. The solubility of the nitrofurfural compounds in water may be enhanced by formulation of addition compounds with organic or inorganic bases, such as piperazine or sodium carbonate.

To the compositions may be added other coccidiostats, such as nicarbazin, sulphaquinoxaline and acinitrazole, and therapeutic agents such as antibiotics, e.g. tetracycline.

The percentage of active ingredient in the compositions of the invention may be varied, it being necessary that it should constitute a proportion such that a suitable dosage for the therapeutic effect desired in the species of animal shall be obtained. Obviously several unit dosage forms may be administered at about the same time. The preferred percentage of active substance in the compositions is 5 to 50% for veterinary compositions and 10 to 90% for pharmaceutical compositions. The veterinary compositions may be diluted before use to contain preferably between 0.005% and 0.5% of the nitrofurfural derivative.

The following examples illustrate therapeutically useful compositions according to the invention.

*Example III*

A solid mixture containing the following ingredients:

|  | G. |
|---|---|
| N-(5'-nitrofurfurylidene)lactic acid hydrazide | 11.0 |
| Wheat meal feed run | 50.8 |
| Maize gluten feed | 38.2 | was prepared to give a mixture containing 11.0% of the active ingredient. The active material was administered at a final concentration of 0.011% to poultry by adding 11.0 g. of the above mixture to 10.0 kg. of feed material.

*Example V*

A solid mixture containing the following ingredients:

|  | G. |
|---|---|
| N-(5'-nitrofurfurylidene)lactic acid hydrazide | 45 |
| Calcium carbonate (light) | 5 |
| Lactose | 50 | was prepared to give a concentrate containing 45% of active material. This mixture is added to poultry feed or drinking water to give a final concentration of 0.0125% of active material.

*Example V*

A mixture containing:

|  | G. |
|---|---|
| N-(5'-nitrofurfurylidene)lactic acid hydrazide | 5 |
| Lactose | 94.52 |
| Sodium lauryl sulphate | 0.48 | was prepared. The mixture was added to the poultry feed or drinking water to give a final concentration of 0.011%.

We claim:
1. A compound of the formula:

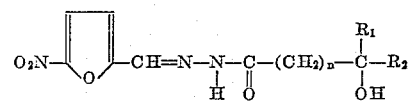

wherein $R_1$ represents a member of the class consisting of a hydrogen atom and a lower alkyl group, $R_2$ represents a member of the class consisting of a hydrogen atom and methyl and ethyl groups, and $n$ is selected from the group consisting of 0, 1, 2 and 3.

2. N-(5'-nitrofurfurylidene)lactic acid hydrazide.

References Cited in the file of this patent

UNITED STATES PATENTS

| 2,319,481 | Stillman et al. | May 18, 1943 |
| 2,416,236 | Stillman et al. | Feb. 19, 1947 |
| 2,626,258 | Ward | Jan. 20, 1953 |

OTHER REFERENCES

Dodd et al.: J. Amer. Pharm. Assoc., vol. 39, 1950, pp. 313–315.

Grammaticakis: Chem. Abstracts, vol. 49 (1955), col. 7382–4 (abstract of Bull. Soc. Chim., France, 1954, pp. 1372–80).